(No Model.) 2 Sheets—Sheet 1.
W. S. REEVE.
CHECK ROWING ATTACHMENT FOR CORN PLANTERS.
No. 316,662. Patented Apr. 28, 1885.
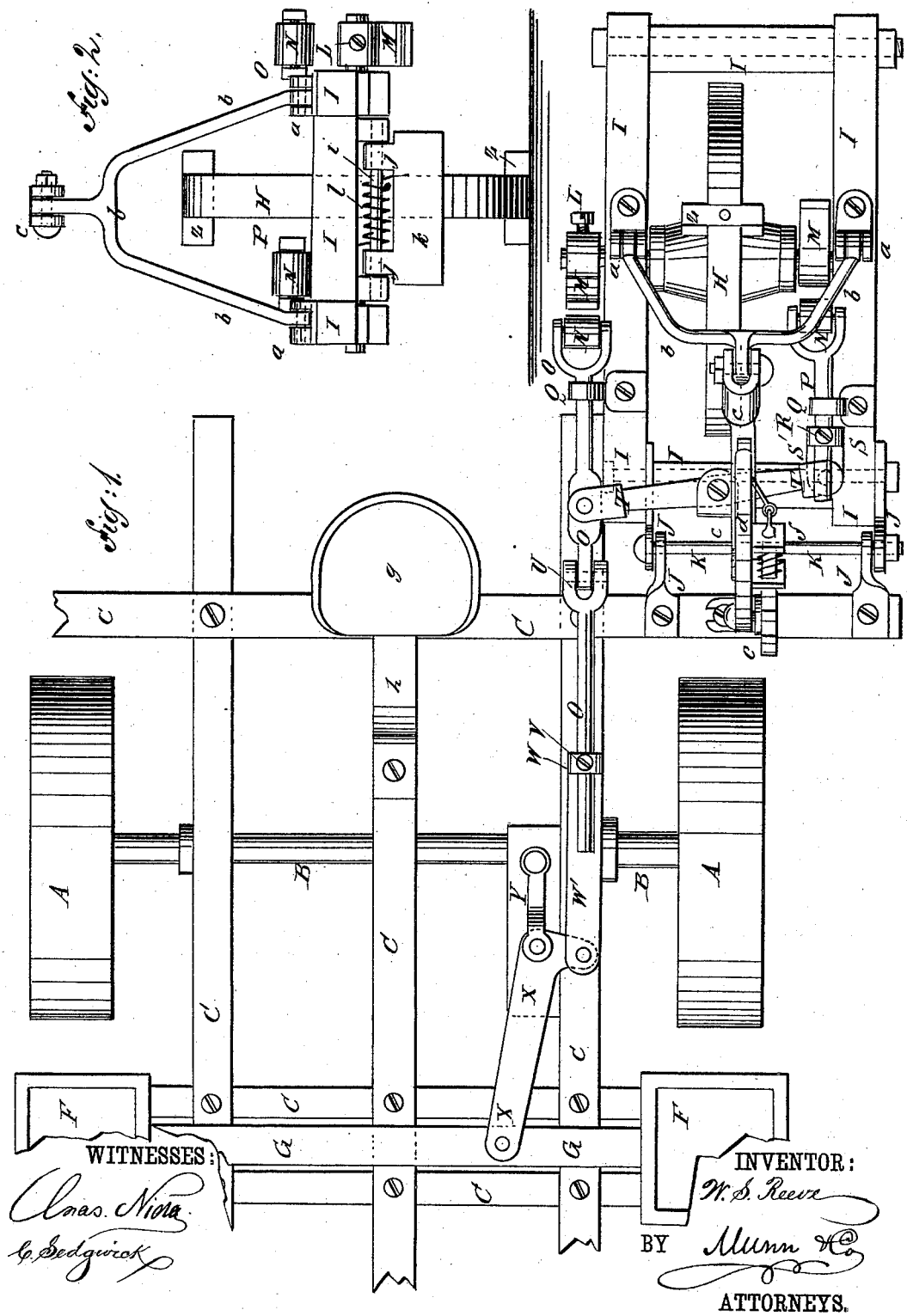
WITNESSES:
INVENTOR:
W. S. Reeve
BY Munn & Co.
ATTORNEYS.

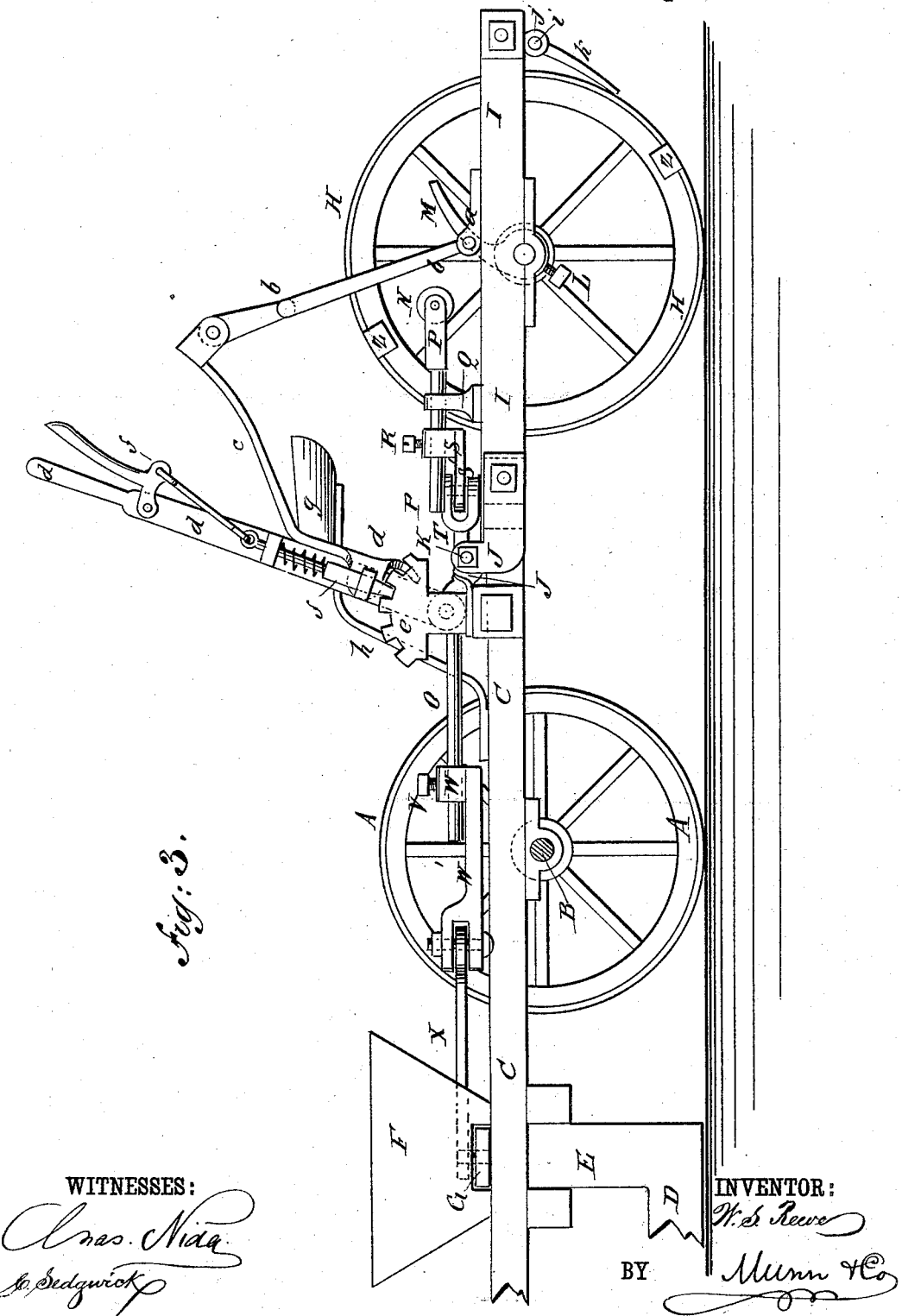

UNITED STATES PATENT OFFICE.

WILLIAM S. REEVE, OF EDWARDSPORT, INDIANA.

CHECK-ROWING ATTACHMENT FOR CORN-PLANTERS.

SPECIFICATION forming part of Letters Patent No. 316,662, dated April 28, 1885.

Application filed October 30, 1884. (No model.)

*To all whom it may concern:*

Be it known that I, WILLIAM S. REEVE, of Edwardsport, in the county of Knox and State of Indiana, have invented new and useful Improvements in Check-Rowing Attachments for Corn-Planters, of which the following is a full, clear, and exact description.

Reference is to be had to the accompanying drawings, forming part of this specification, in which similar letters of reference indicate corresponding parts in all the figures.

Figure 1, Sheet 1, is a plan view of my improved attachment shown as applied to a corn-planter. Fig. 2, Sheet 1, is a rear elevation of the attachment. Fig. 3, Sheet 2, is a side elevation of the attachment and the planter, part being broken away.

The object of this invention is to provide attachments for ordinary corn-planters constructed in such a manner that the planting can be done in accurate check-rows, and which shall be simple in construction and not liable to get out of order.

The invention relates to a check-rowing attachment for corn-planters, constructed with a frame carrying a wheel having cams attached to its journals to operate unequal sliding rods connected by an equal-armed lever, and the longer rod connected with the seed-dropping slide of a planter by an elbow-lever, so that the said seed-dropping slide will be operated by the revolution of the said wheel.

The invention consists of the combinations of parts and their construction, substantially as hereinafter fully set forth, and pointed out in the claims.

A represents the wheels, B the axle, C the frame, D the runners, E the hollow standards, F the seed-boxes, and G the seed-dropping slide, of an ordinary corn-planter.

H is a wheel of such a size that its circumference will equal twice the required distance apart of the hills. The journals of the wheel H revolve in bearings attached to the side bars of a frame, I, the forward end of which is connected with the rear end of the planter-frame C by eye-straps J and a bolt, K, or other suitable hinges in such a position that the wheel H will be exactly in the rear of one of the wheels A, and will thus travel in the smooth track of the said wheel A.

To the wheel H, or to the journals of the said wheel, are secured, by set-screws L or other suitable means, two cams, M, which project in opposite directions, as shown in Fig. 1, so as to operate successively upon friction-rollers N, pivoted to the forked rear ends of the rods O P, sliding in bearings Q, attached to the side bars of the frame I. The rod P is short, and to its forward end is secured, by a set-screw, R, or other suitable means, a collar, S, provided with a lug, S', to which is pivoted the end of an equal-armed lever, T. The lever T is pivoted at its center to the forward cross-bar of the frame I, and its other end is pivoted to the rod O. The rod O is made long, and has a joint, U, formed in it in such a position as to be about in line with the axis of the hinges J K when the equal-armed lever T is at right angles with the two rods O P.

To the forward end of the rod O is secured, by a set-screw, V, or other suitable means, a collar, W, provided with a lug, W', which may be made long, and to it is pivoted the short arm of an elbow-lever, X. The lever X is pivoted at its angle to a support, Y, attached to a longitudinal bar of the frame C or other support, and the long arm of the said lever is pivoted to the aforesaid dropping-slide G. With this construction the rods O P will be pushed forward successively by the cams M, the forward movement of each rod causing the equal-armed lever T to draw the other rod back ready to be pushed forward in turn; and the forward-and-backward movement of the rod O will vibrate the lever X and cause it to operate the seed-dropping slide G and drop the seed.

To the opposite parts of the rim of the wheel H are attached blocks Z, which are so arranged with reference to the cams M as to come to the ground directly over the places where the seed is planted, and thus mark the hills to serve as a guide to the driver in keeping the cross-rows straight.

To lugs *a* or other supports attached to the middle parts of the side bars of the frame I are hinged the ends of a bail, *b*, to a lug, formed upon the center of which is hinged the end of an elastic bar, *c*. The other end of the elastic bar *c* is attached to the lever *d* at a little distance from its lower end. The lower end of the lever $d$ is pivoted to a support attached to the rear end of the frame C, so that the frame I and its attachments can be raised from the ground by operating the said lever $d$. The lever $d$ oscillates along the side of a catch-plate, $e$, secured to the rear end of the frame C, and with the toothed edge of which engages the spring-lever pawl $f$, connected with the said lever $d$, so that the said lever will be held securely in any position into which it may be adjusted. With this construction, should the wheel H strike an obstruction the elasticity of the bar $c$ will allow the said wheel to rise and pass over the said obstruction. With this construction, also, by adjusting the lever $d$ the wheel H can be held down upon the ground with any desired pressure.

$g$ is the driver's seat, the standard $h$ of which is attached to the rear part of the frame C in such a position that the driver from the said seat can readily reach and operate the lever $d$.

To the rear cross-bar of the frame I is attached a rod, $i$, which passes through lugs $j$, formed upon or attached to the upper edge of the plate $k$. The lower edge of the plate $k$ is held forward against the face of the wheel H by a spiral spring, $l$, placed upon the rod $i$, with one end connected with the said plate, and with its other end connected with the rear cross-bar of the frame I.

Having thus described my invention, what I claim as new, and desire to secure by Letters Patent, is—

1. A check-rowing attachment for corn-planters, constructed substantially as herein shown and described, and consisting of the frame I, the wheel H, having cams M, the unequal sliding rods O P, supported in bearings Q, the equal-armed lever T, connecting the said rods O P, the ends of said lever being connected, respectively, to one end of the rod P and to a point upon the rod O intermediate of its ends, and the elbow-lever X, pivoted to lug W', connected by a collar, W, to a jointed section or arm of the longer rod, as set forth.

2. The combination, with the planter-frame C and the seed-dropping slide G, of the frame I, the wheel H, the cams M, the unequal sliding rods O P, the equal-armed lever T, connecting the said rods, said lever having at one end arms embracing and pivoted to a lug, S', of a collar, S, adjustably connected to the rod P, and the elbow-lever X, pivoted to the longer rod, substantially as herein shown and described, whereby the said seed-dropping slide will be operated by the revolution of the said wheel, as set forth.

WILLIAM S. REEVE.

Witnesses:
 THOMAS S. FIELDS,
 HUGH BAU, Jr.